United States Patent [19]

Hurst

[11] 4,189,038

[45] Feb. 19, 1980

[54] DRIVE COUPLING AND CLUTCHES

[75] Inventor: John W. Hurst, Port Huron, Mich.

[73] Assignee: Chrysler Corporation, Highland Park, Mich.

[21] Appl. No.: 816,406

[22] Filed: Jul. 18, 1977

[51] Int. Cl.² ............... F16D 43/21; F16D 13/28
[52] U.S. Cl. ................... 192/21; 192/48.91; 192/54; 192/93 A
[58] Field of Search ............ 192/21, 48.91, 54, 51, 192/93 A

[56] References Cited

U.S. PATENT DOCUMENTS

| 3,901,361 | 8/1975 | Brownlie | 192/21 |
| 3,946,841 | 3/1976 | Lafollette et al. | 192/21 X |
| 3,977,503 | 8/1976 | Hurst | 192/93 A X |

Primary Examiner—Allan D. Herrmann
Attorney, Agent, or Firm—Baldwin & Newtson

[57] ABSTRACT

Corresponding sets of radially distributed helical surfaces in a cone clutch axially urge movable cone members selectively into engagement with either of two mating cone members thereby enabling a clutch output member to be driven in either rotary direction.

19 Claims, 16 Drawing Figures

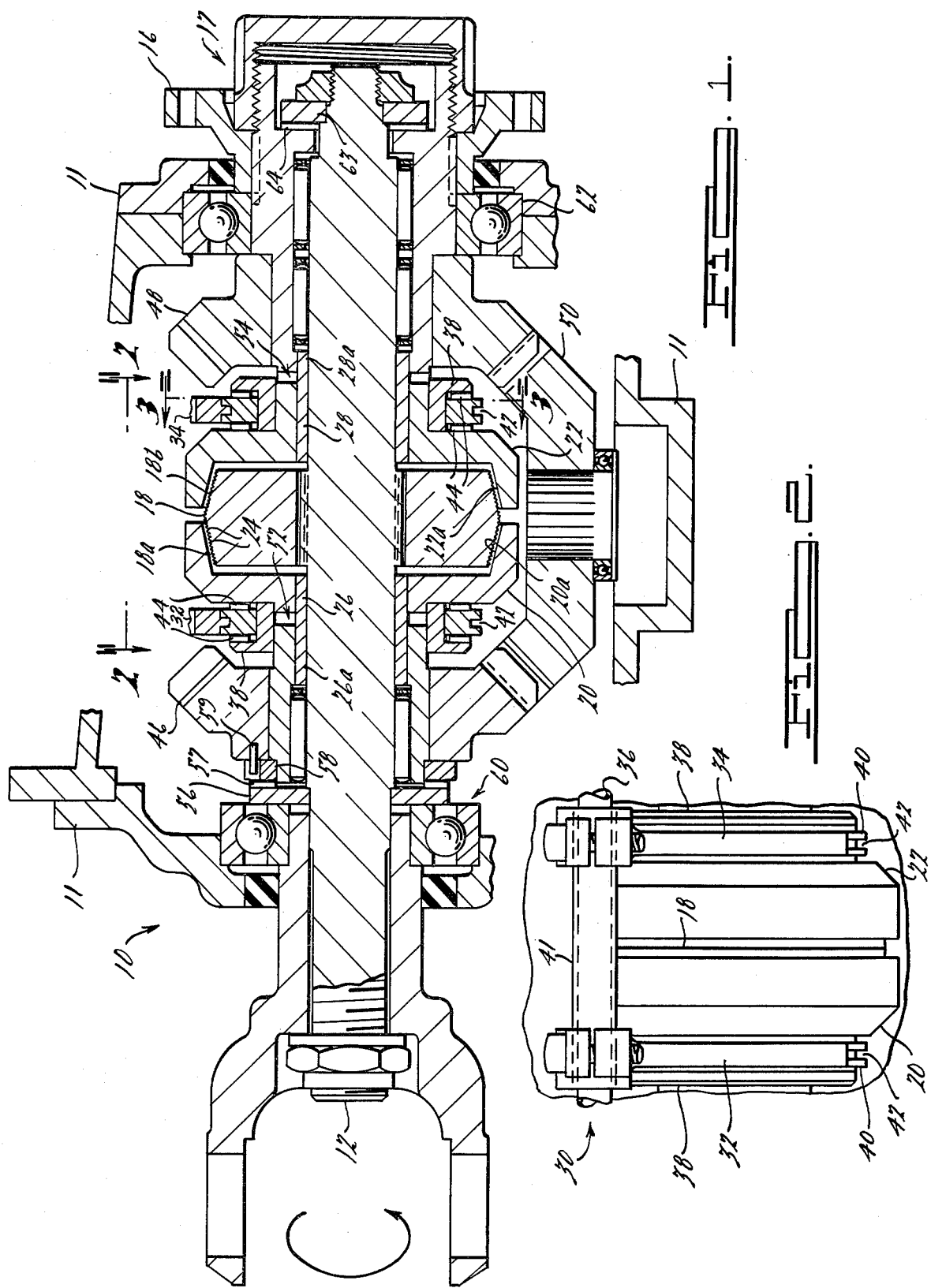

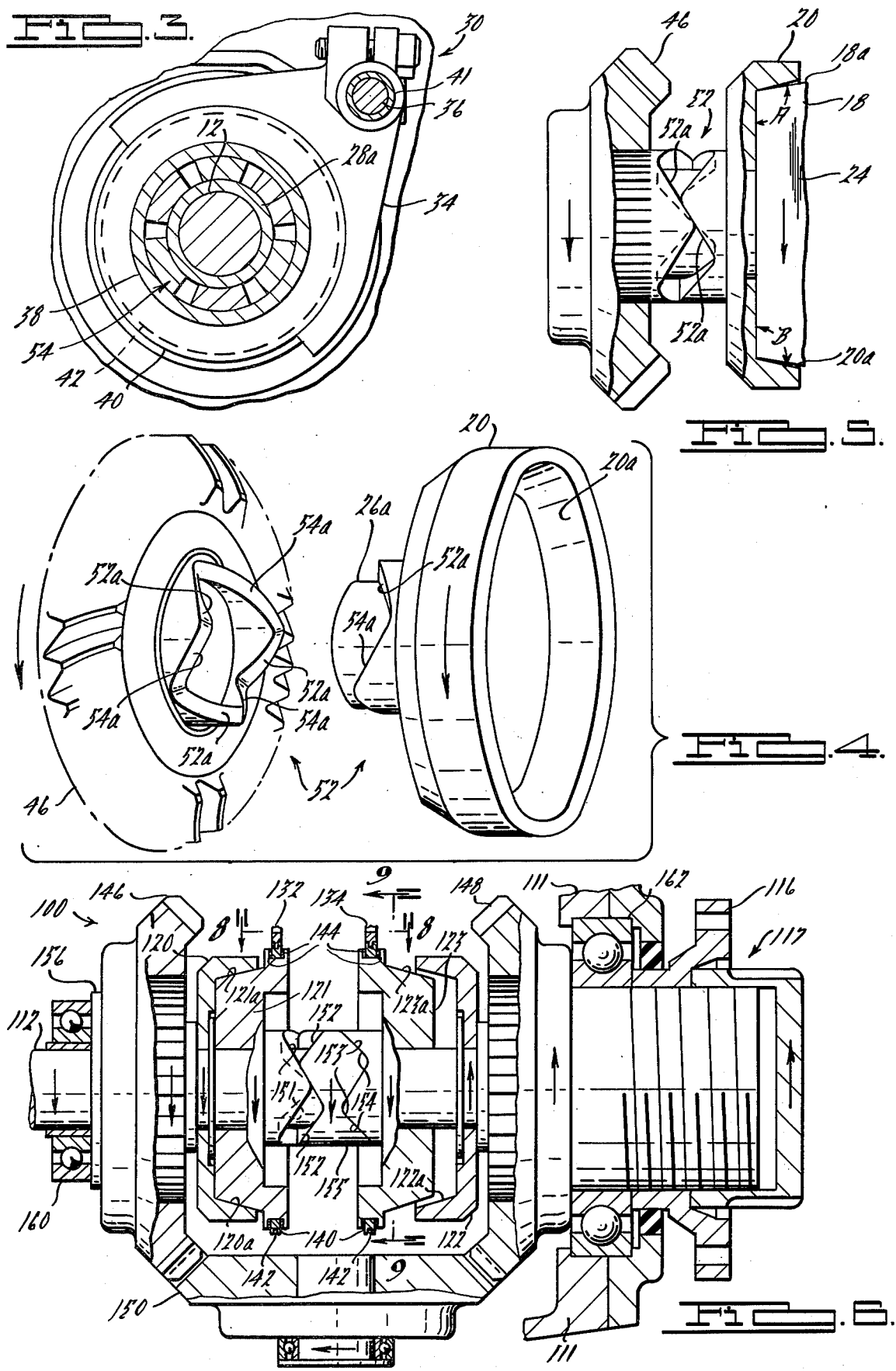

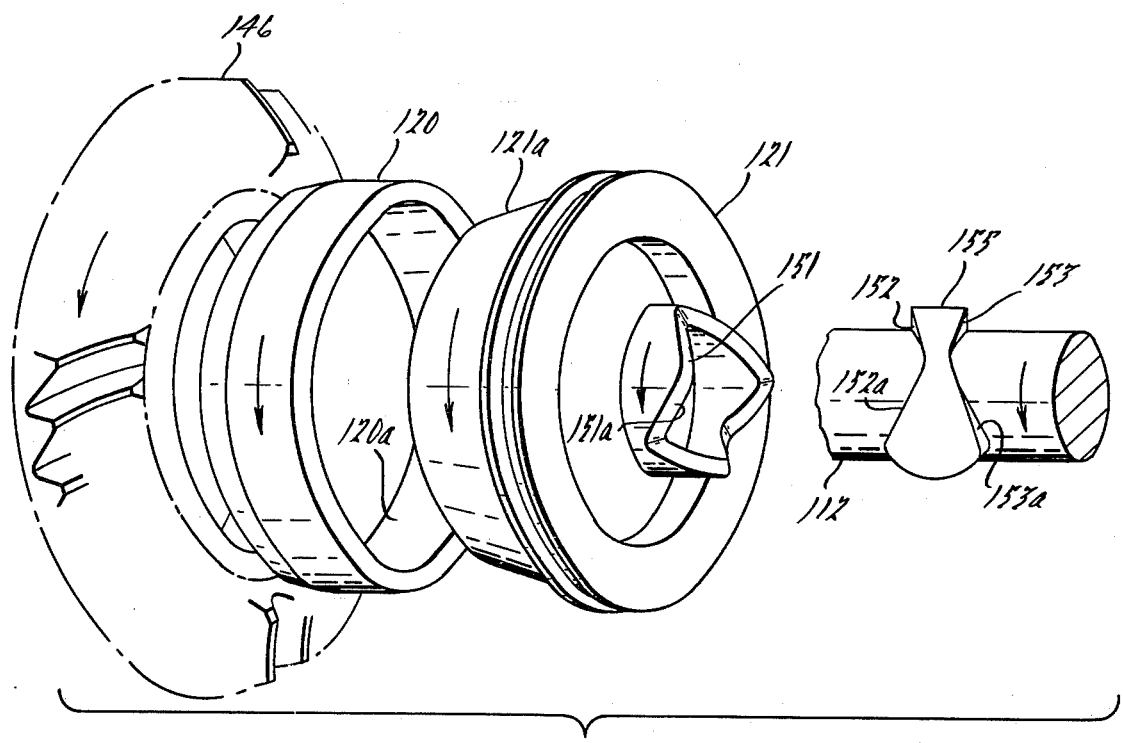
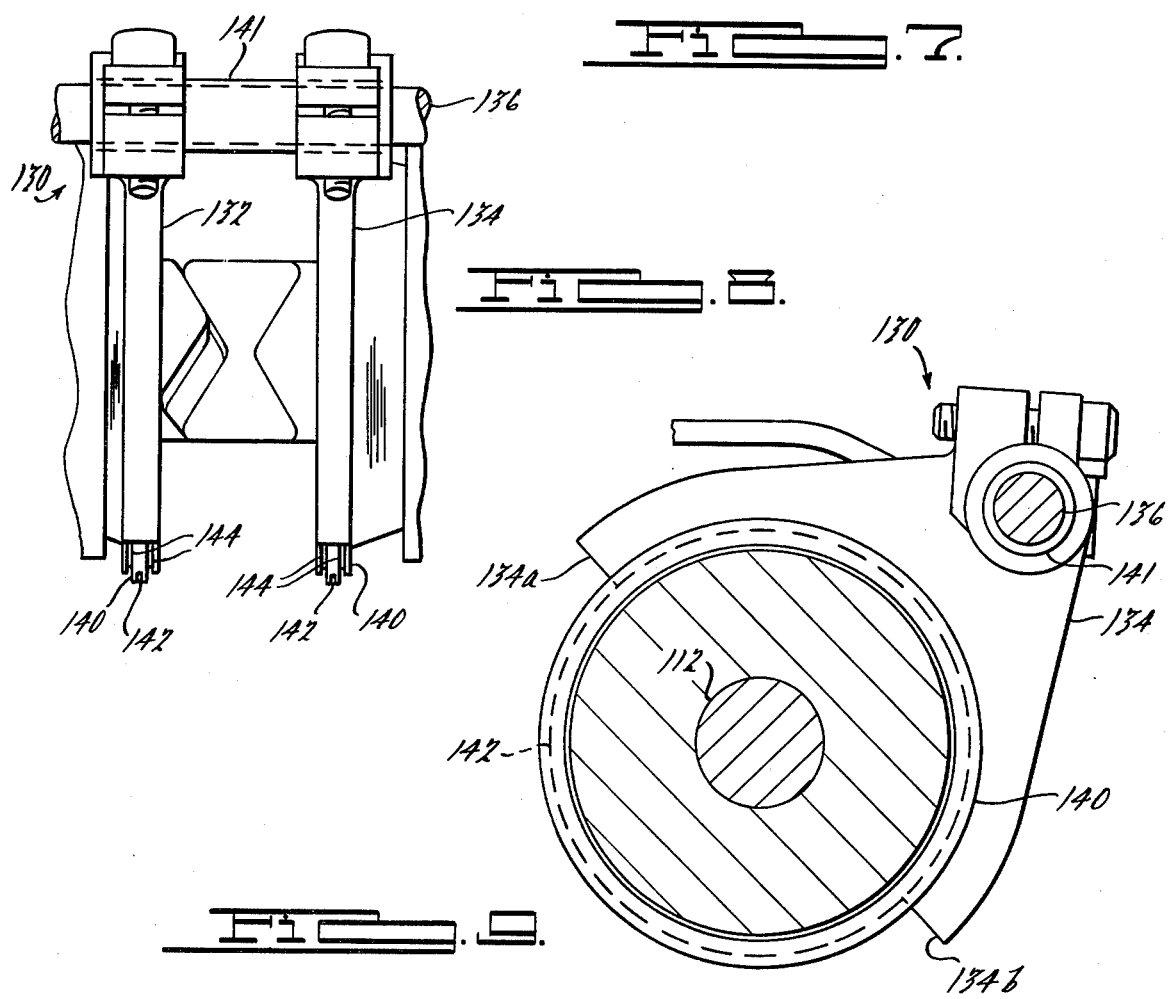
FIG. 7.
FIG. 8.
FIG. 9.

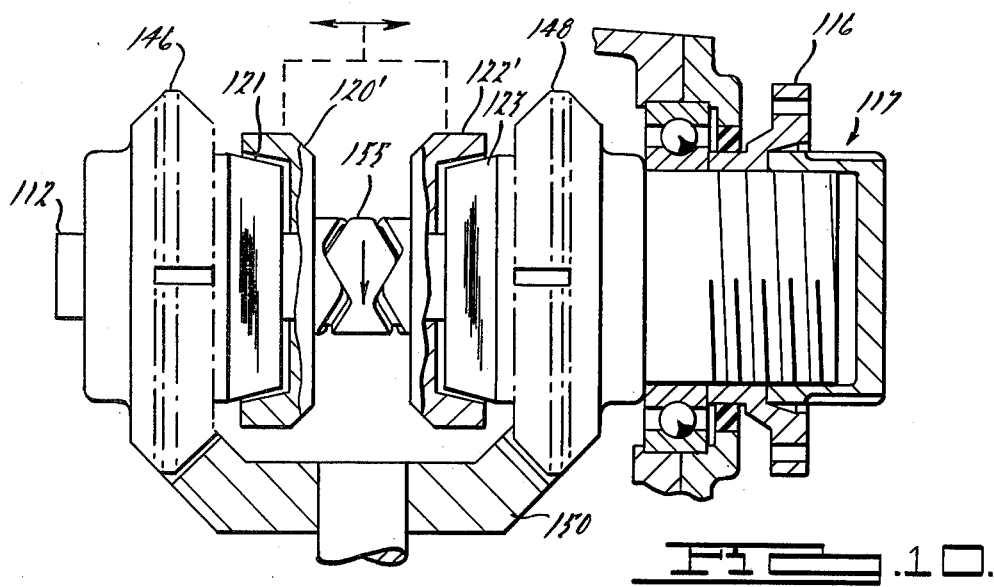
FIG.10.
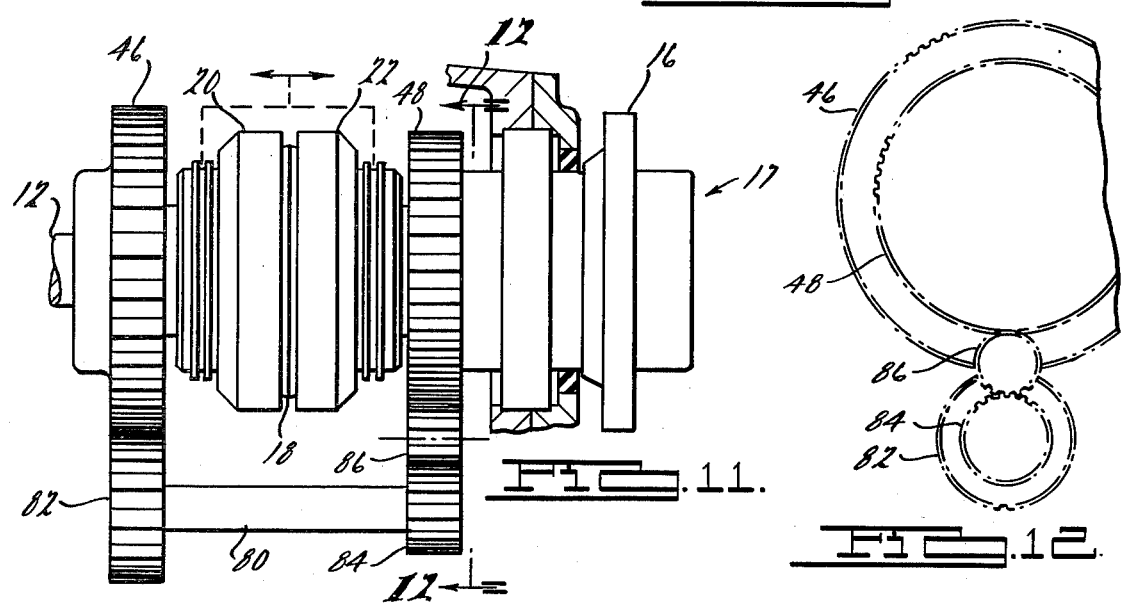
FIG.11.
FIG.12.
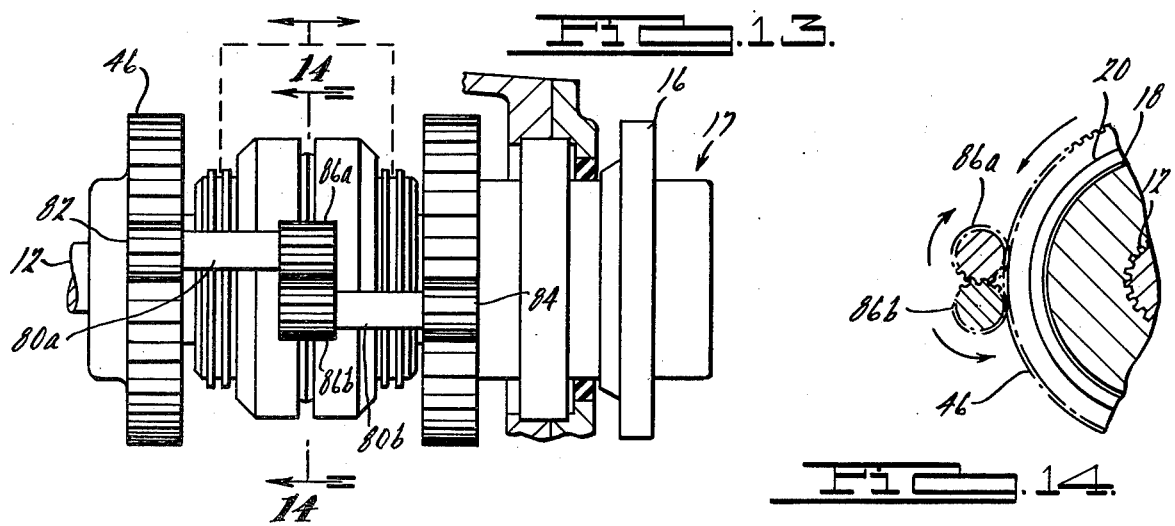
FIG.13.
FIG.14.

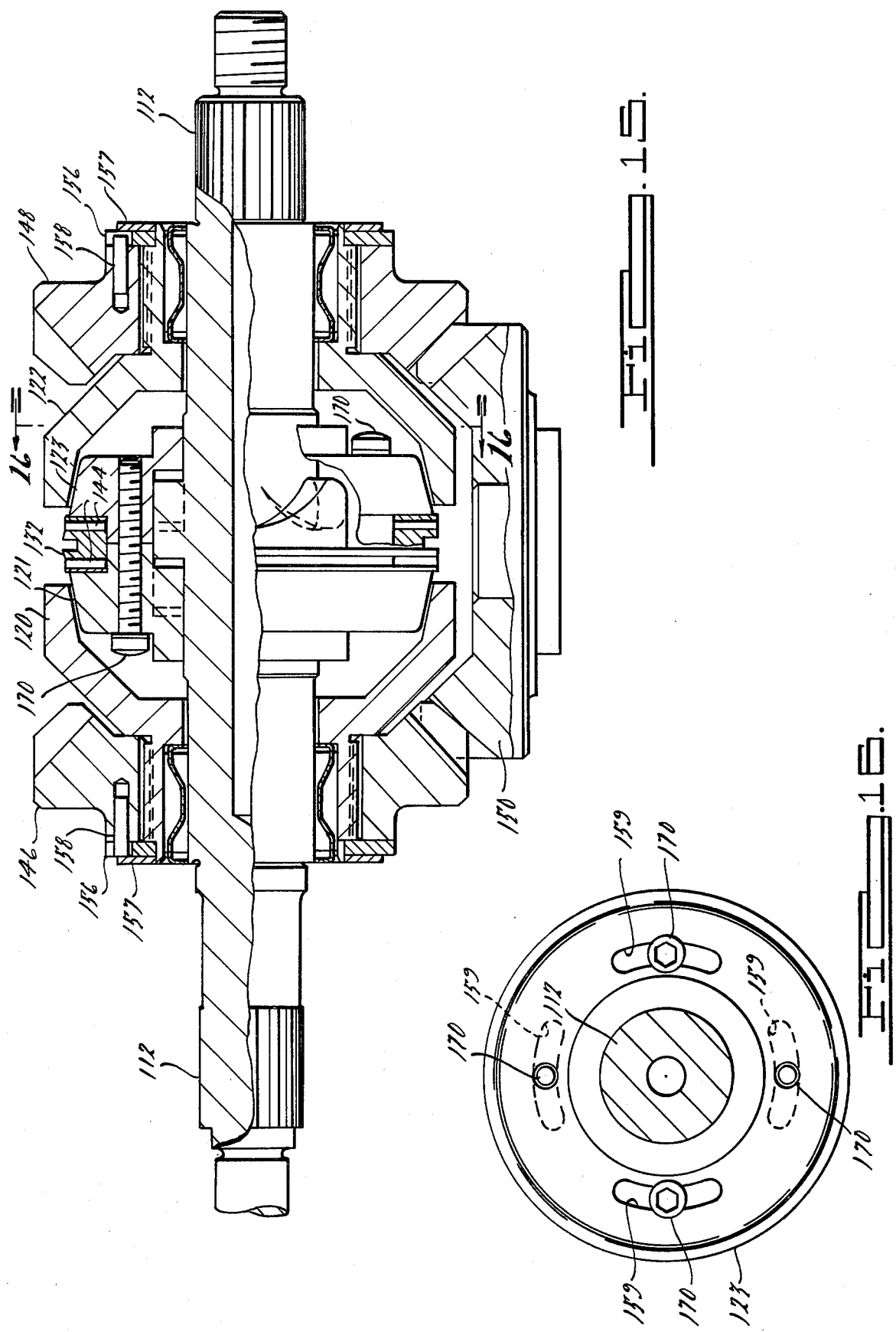

DRIVE COUPLING AND CLUTCHES

BACKGROUND OF THE INVENTION

The invention relates to drive couplings and clutches. In its most preferred form it comprises a cone clutch or reversible drive coupling for inboard marine engine installations and for other drive devices. It is not limited to marine application.

This invention is most closely related to subject matter of U.S. Pat. No. 3,977,503. Another related patent is U.S. Pat. No. 4,022,308. U.S. patent application Ser. No. 679,529, now U.S. Pat. No. 4,051,934, entitled "Bi-directional Drive Coupling" and U.S. patent application Ser. No. 706,365 entitled "Clutch Shifting Mechanism" are also related to this invention.

SUMMARY OF THE INVENTION

In the preferred embodiments of this invention, corresponding radially distributed paired sets of helical camming surfaces abut in axial overlapping relationship as they extend from portions of a drive shaft or portions of an adjacent gear member and also as they extend from portions of an axially movable cone clutch member carried by the shaft to form the overlap. Consequently, the paired sets of camming surfaces are able to drivingly engage when the clutch is activated and a cone member is moved axially to engage a mating cone member. The clutch members are arranged to provide rotation to an output means. In addition, the camming surfaces coact to urge the cone members into positive engagement.

THE DRAWING

FIG. 1 is a side elevational view in section of a preferred drive coupling embodiment in a neutral condition and showing various features of the invention.

FIG. 2 is a fragmentary plan view of an upper portion of FIG. 2 taken from line 2—2 in FIG. 1.

FIG. 3 is a fragmentary sectional view taken along line 3—3 of FIG. 1.

FIG. 4 is an exploded detail perspective view of a part of FIG. 1 showing a female cone-gear pair and the helical surfaces on adjacent end portions of the cone-gear pair.

FIG. 5 is a fragmentary sectional view of part of FIG. 1 showing the helical surfaces of a gear and female cone in driving engagement and the conical surfaces of female and male cones in driving engagement.

FIG. 6 is a side elevational view in section of another preferred embodiment of a reversing clutch embodying various features of the invention and in a driving condition.

FIG. 7 is an exploded detail perspective view of portions of the reversing clutch of FIG. 6 showing the helical surfaces on abutting portions of a male cone member and the input shaft.

FIG. 8 is a fragmentary plan view of an upper portion of FIG. 6 taken from line 8—8 in FIG. 6.

FIG. 9 is a fragmentary plan view taken along line 9—9 of FIG. 6.

FIG. 10 is a side elevational view in section showing an alternate embodiment of the reversing clutch of FIG. 6 in a neutral condition.

FIG. 11 is another embodiment of the invention in which a lay shaft arrangement is used.

FIG. 12 is a diagramatic showing taken from line 12—12 of FIG. 11.

FIG. 13 is another embodiment of the invention in which a lay shaft arrangement is used.

FIG. 14 is a section view taken from line 14—14 of FIG. 13.

FIG. 15 is a variation of the embodiment shown in FIG. 6 and is shown in partial cross section.

FIG. 16 is a plan view of the male cone of the coupling of FIG. 15 viewed from line 16—16, the cone is shown rotated a quarter of a turn from its position in FIG. 15.

PREFERRED EMBODIMENT

FIGS. 1-5 show a reversing clutch generally designated 10 having a stationary housing 11 shown fragmentarily. A unidirectionally rotated input shaft 12 carries various clutch members and elements, described below in detail, which coact in combination to provide a reversible rotary output to an output means, such as rotatable flange 16, which is then capable of selectively driving in either of two reverse rotary directions, arbitrarily termed "forward" and "reverse" herein.

Fixed to or integral with input shaft 12 and rotatable therewith are a pair of rotary clutch element means in the form of opposing frusto-conical convex faces 18a and 18b carried by a drive member or male cone member 18. To one side of male cone member 18, shaft 12 carries another rotary clutch element means in the form of a female cone member 20. To the other side, another rotary clutch element means in the form of a female cone member 22 is carried. The female cones have frusto-conical concave interior rim portions or faces 20a and 22a, respectively. Female cone member 20 is mounted on shaft 12 so that it may rotate freely thereon and also be axially movable over a range of travel toward and away from male cone member 18. Female cone member 22 is similarly mounted on shaft 12. This arrangement provides a coupling or cone clutch wherein the second and third members 20 and 22 are oppositely coned female clutch members and the first drive member 18 is a mating coned male clutch member.

As in the case with many clutches, this one is preferably carried inside the housing substantially immersed in oil. It is therefore preferred that either the rim portions of 20a and 22a or the face portions 18a and 18b of member 18, as shown in FIGS. 1 and 5, be provided with a plurality of small grooves 24 arranged to wipe oil from therebetween when any of the surface portions of these members come into mutual contact during operation of the clutch. This may be further understood as to purpose and arrangement by having reference to the teaching set forth in the Society of Automotive Engineers paper No. 311B entitled *Automatic Transmission Friction Elements* by Froslie, Milek and Smith, which was delivered at the SAE meeting of Jan. 9-13, 1964, with particular reference to pp. 2-3 thereof.

To provide stable axial movement for female cone members 20 and 22, they are each fixed to a bushing 26 and 28, respectively, for sliding movement on shaft 12 which carries them. Each of the bushings include an extending portion 26a and 28a, respectively, best illustrated in FIG. 4, which further provides for stable sliding movement of each female cone on shaft 12.

Each female cone member 20 and 22 is provided with means generally designated 30, shown in FIGS. 2 and 3, for selectively moving the female cone into and out of contact with the male cone member 18. Preferably, means 30 will take the form of a pair of arcuate fork members 32 and 34 movably mounted on a rail 36. Each of the fork members is connected to one of the female cones. An arrangement for this connection is shown in drawing FIGS. 2 and 3 and includes an annular member 38 fitted to each of the female cones as by the screw threads on the extending portion of the cone as is best shown in FIGS. 1 and 4. Each member 38 carries a ring 40 having an annular groove 42. Ring 40 is positioned between two annularly distributed sets of needle bearings indicated at 44 which facilitates rotation of ring 40 relative to its corresponding female cone member. In addition to decreasing friction between the forks and the clutch members which receive them, the making and breaking of contact between male cone member 18 and the respective female cone member is facilitated with less effort by the use of such a bearing arrangement. Means 30 will preferably be designed to provide simultaneous movement of the forks and female cone members as by tying the two forks together for simultaneous movement through a sleeve 41 which slides on rail 36. The forks may be attached to the sleeve by bolts as shown in FIGS. 2 and 3. With such an arrangement both female cones may be readily placed in a neutral condition relative to the male cone member 18, as shown in FIG. 1. Also, one or the other of the female cones may be selectively brought into contact with male cone member 18 to provide a forward or reverse driving condition. A driving condition is illustrated in FIG. 5 which shows female cone 20 contacting male cone 18 to provide a forward rotational condition (arbitrarily selected) for output flange 16. A somewhat modified arrangement for controlling the positioning of the forks and cones is shown in the above-referenced U.S. Patent application Ser. No. 706,356.

In the drive coupling embodiment of FIGS. 1–5 the rotation of output flange 16 is provided by interaction between three gears. One of the gears 46 is carried on input shaft 12 and is free to rotate thereon. The second gear 48 is carried on shaft 12 also and is free to rotate thereon. Fixed thereto is an output flange assembly 17 including output flange 16 so that gear 48 and flange 16 rotate together. Gears 46 and 48 are substantially axially fixed on shaft 12, i.e., slight movement is acceptable such as in the range of about 0.010 inch. Rotation of either gear 46 or 48 causes rotation of gear 50 and hence rotation is transmitted between gears 46 and 48 by gear 50.

In this embodiment gears 46 and 48 are driven by the respective female cone to which they are adjacent and with which they respectively abut. Each gear is placed on shaft 12 adjacent a side of the respective female cone which is opposite the female cone side to which the male cone is adjacent. In other words, each female cone is positioned between the male cone and one of the rotatable gears 46 or 48, respectively.

Interconnection for coaction between the female cone members and their respective adjacent abutting gear is constantly provided by sets of a plurality of complementary radially distributed overlapping helical camming surfaces, generally designated at 52 and 54, best seen in FIGS. 4 and 5, which are carried on adjacent abutting portions of the female cone-gear pairs 20–42 and 22–48, respectively. The helical surfaces are formed on adjacent portions of the female cone-gear pairs, as shown, in the form of cylindrical abutting end portions or side portions thereof, 52 and 54, respectively. As shown in FIG. 4, it is preferred that at least three driving or active helical surfaces be provided on each member of each set. However, two per member or more than three are acceptable.

For this embodiment, the spiral direction of the helical surfaces is in an opposite direction for each cone-gear pair 20–46 and 22–48, i.e., the helical surfaces are "opposite handed" to provide proper coaction for opposite directions of rotation of output flange 16 depending on which cone-gear pair is driving gear 50 and is being driven in turn by male cone 18. As is illustrated in FIG. 5, the helical surfaces may be symmetrical and thus alternate surfaces may be used to obtain "opposite handedness". Thus, in FIG. 4, helical surfaces 52a on the female cone-gear pair 20–46 would coact to drive gear 50 through gear 46 when cone 20 is engaged with male cone 18; rotation of gear 46 and female cone 20 being in the direction indicated by the arrows. On the other hand, due to the symmetrical arrangement of the surfaces flipping cone 20 and gear 46 through 180° will allow the same shaped parts to function as female cone-gear pair 22–48. In such an instance, the drive action will be through helical surfaces 54a. As shown, the helical surfaces 52a of cone-gear pair 20–46 spiral in one direction; see FIGS. 4 and 5. On the other hand, the helical surfaces 54a of cone-gear pair 22–48 spiral in a second direction.

Since the helical surfaces of each cone-gear pair are constantly overlapping over the entire extent of the axial travel of each female cone, constant driving engagement between each female cone-gear pair is readily provided when the female cone is brought into contact with the rotating male cone 18. Interaction of the helical surfaces upon rotation also provides a positive force which urges the female cone against the male cone to improve the coupling action therebetween.

Gear 46 rests against a thrust washer 56, circular shaped bearing 57 and a bearing race 58, which is pinned by pin 59 to gear 56, on shaft 12. The thrust washer in turn rests against another set of bearings and races generally indicated at 60. The thrust washer is fixed to shaft 12 and rotates with it. Also, the thrust washer may, if desired, be especially adapted to cause circulation of the lubricating oil, in which the clutch is operated, inside housing 11. One such arrangement is shown in related application Ser. No. 679,529 in which the oil is circulated to various clutch members on the shaft. This is accomplished in that application by providing paddle-like extensions on the washer which, upon rotation, push the oil in housing 11 through conduits (not shown) in shaft 12 to distribute it to various parts of the drive coupling.

Gear 48 and assembly 17 to which it is connected for joint rotation rests against a bearing race generally indicated at 62 and also against a thrust washer 63 and a thrust bearing 64.

The clutch described above operates as follows. As is common, the rotary output of an engine is normally in one given direction. Thus, rotation of input shaft 12 when driven by an engine will be unidirectional, for example, in the counterclockwise direction indicated by the arrow in FIG. 1 and viewed from the aft end of the shaft, i.e., the right-handed end shown in FIG. 1 (arbitrarily selected). All references to rotation are made from this vantage point in the specification. It follows that male cone 18 will be unidirectional in rotation also and will rotate with input shaft 12 in the same direction. Axial movement of female cone 20 into contact with male cone 18 as shown in FIG. 5 causes rotation of gear 46 through the engaged overlapping helical surfaces 52a and rotation of meshing gear 50 and output flange 16 in a first rotary direction. During this action, female cone 22 idles on shaft 12 and is driven by gear 48.

If female cone 20 is moved away from male cone 18 and female cone 22 is placed in contact with the male cone, rotation of gear 46 occurs in a direction opposite that of previously rotating gear 46 and meshing gear 50 follows in the opposite rotary direction along with gear 46 which idles on input shaft 12.

Engagement and disengagement between the conical surfaces of the female cones and the male cone is facilitated by making the conical angles thereof slightly different to obtain a slight mismatch therebetween. For example, as illustrated in FIG. 5, the angle A of the male cone face 18a is lesser than the angle B of the face 22a of the female cone 22.

Other arrangements of the clutch members are possible. For example, the function of the male and female cones may be interchanged. Compare FIGS. 1, 6 and 10 in this connection. This is true for all the various embodiments as is discussed further hereinbelow.

Other embodiments are shown in FIGS. 11–14 which are similar in structure and operation to FIG. 1 except for the gear means used to interconnect gear 46 and gear 48. In these embodiments, lay shaft arrangements 80 have additional rotary gears meshing with gears 46 and 48. For example, in FIGS. 11 and 12, lay shaft 80 has a rotary gear 82 and a rotary gear 84 affixed to each end. Gear 82 meshes with gear 46. Gear 84 meshes with gear 86 which meshes with gear 48.

With the arrangement of FIGS. 11 and 12, unidirectional input shaft 12 drives output flange 16 in either of two rotating directions when the coupling is operated by axial movement of the drive members 20 or 22. An advantage to this embodiment is that gear sizes may be easily changed to obtain reduction or other mechanical advantages.

The embodiment of FIGS. 13 and 14 is similar to that of FIGS. 11 and 12. The lay shaft 80 is in two pieces 80a and 80b which are interconnected by rotary gears 86a and 86b whereby rotary motion may be transmitted between gears 46 and 48.

FIGS. 6–9 show another reversing clutch embodiment of the invention generally designated as 100 and having a housing portion 111 shown fragmentarily. A unidirectionally rotated input shaft 112 carries various clutch members and elements, described below in detail, which coact in combination to provide a reversible rotary output to an output means, such as rotatable flange 116 which is then capable of selectively driving in either of two reverse rotary directions, "forward" and "reverse".

Input shaft 112 of this embodiment carries a first pair of rotary clutch elements or female cone members 120 and 122 having frusto-conical concave interior rim portions or engagement faces 120a and 122a, respectively. Female cone members 120 and 122 are both mounted on shaft 112 so they may rotate thereon within the limits of their engagement with other members and are axially retained in an axial location on the shaft.

Also carried by shaft 112 and rotatable thereon is a second pair of rotary clutch elements or male cone members 121 and 123, each having opposing frusto-conical convex engagement faces 121a and 123a, respectively.

Male cone members 121 and 123 are arranged to be rotatable and axially movable on shaft 112 over a range of travel such that either surface 121a or 123a may be selectively brought into engagement with surface 120a or 122a, respectively, by axially moving either of the male cone members. Also, the male cone members may be axially placed on shaft 112 in an intermediate position between the two female cone members such that no engagement is made with either of them.

The above described arrangement provides a cone clutch. As is the case with many clutches and as pointed out hereinabove, this one is also preferably carried inside a housing 111 which contains a substantial amount of oil. Consequently, the clutch members may be partially or wholly immersed in lubricating oil (not show). It is therefore preferred that either the engagement faces of 120a and 122a or the engagement faces of 121a and 123a be provided with a plurality of small grooves (not shown) arranged to wipe oil from therebetween when any of the faces of these members come into mutual contact during operation of the clutch as described hereinabove in connection with the embodiment shown in FIG. 1.

Male cone members 121 and 123 are provided with a shift control means generally designated 130 (best seen in FIGS. 8 and 9) holding the two male cones together in a fixed axial position on shaft 112 relative to each other. Another purpose of means 130 is for selectively moving either of the male cone members into and out of contact with the female cone members. Means 130 may take the form of a pair of arcuate fork members 132 and 134 slidably mounted on a rail 136. Each of the fork members is connected to one of the male cones as shown in FIGS. 6, 8 and 9. In the arrangement shown, each male cone carries a ring 140 having an annular groove 142. Rings 140 are positioned on the male cone member portions between two annularly distributed sets of needle bearings indicated at 144 which facilitate rotation of the ring 140 relative to its corresponding female cone between the forks and the clutch members which receives them. The making and breaking of contact between a male cone member and the respective female cone member is facilitated with less effort by use of such a bearing arrangement. The bifurcated portions of fork members 132 and 134, such as 134a and 134b shown in FIG. 9, fit into grooves 142 on rings 140 thereby connecting the fork members to respective male cone member portions. Means 130 is preferably designed to provide a simultaneous movement of the forks and male cone members as by tying the two forks together for simultaneous movement through a sleeve 141 which slides on rail 136. The forks may be attached to the sleeve by bolts as shown in FIGS. 8 and 9.

With such an arrangement male cone members 121 and 123 may be readily placed in a neutral condition relative to the female cones by axial movement of means 130, as shown in FIG. 10, for example. Also, either of the male cone members may be selectively brought into contact with its mating female cone member to provide a forward or reverse output driving condition from the clutch. A driving condition is illustrated in FIG. 6 which shows male cone 121 contacting female cone 120 to provide a "forward" rotary condition (arbitrarily selected) for output flange 116.

The rotation of the output flange 116 is provided by interaction between three gears in this embodiment. A pair of spaced relatively rotatable gears 146 and 148 are carried in an axially fixed position on input shaft 112 while the third gear 150 is placed between the first two gears so as to constantly intermesh with them. "Axially fixed" means that the gears should be substantially fixed. Again, slight movement such as on the order of 0.010 inch is acceptable as in other embodiments described herein. Gear 150 is positioned in housing 111 for rotation as shown. Gears 146 and 148, although substantially axially fixed on shaft 112, are freely rotatable thereon with their mated female cones 120 and 122, respectively, to which they are connected. Thus, rotation of either gear causes rotation of gear 150 and rotation of output flange 116 which is connected to gear 148 to rotate therewith by way of assembly 117.

In the embodiment shown in FIGS. 6-9 gears 146 and 148 are driven by the respective female cone to which they are affixed. Each gear is placed on shaft 112 adjacent a side of the respective female cone which is opposite the female cone side to which the male cone is adjacent. In other words each female cone is positioned between a male cone and one of the rotatable gears 146 or 148.

Driving interconnection for coaction between shaft 112 and male cone members 121 and 123 is provided by sets of complementary radially distributed overlapping helical camming surfaces, generally designated at 151, 152, 153 and 154. Helical surfaces 152 and 153 constitute the opposite end surfaces of drive member or annulus 155 carried on and fixed to shaft 112. Annulus 155 may be integral with the shaft or merely affixed thereto. Helical surfaces 151 are end surfaces on male cone member 121 and helical surfaces 154 are end surfaces on male cone member 123. The helical end surfaces in sets 151-152 and 153-154 on adjacent ends of the male cones and shaft annulus 155 are cylindrical and abutting as shown. As shown in FIGS. 1 and 2, it is preferred that at least three driving or active helical surfaces be provided on the ends of each member of each set. However, two per member or more than three are acceptable.

For the embodiment shown in FIGS. 6 and 7, the spiral direction of the helical surfaces is in an opposite direction for each set 151-152 and 153-154, i.e., the helical surfaces are "opposite handed" to provide the coaction resulting in opposite directions of rotation of output flange 116 depending on which set is driving gear 150 for a given direction of rotation of input shaft 112.

As is illustrated in FIG. 7, the helical surfaces may be symmetrical and alternate surfaces in each set may be used to obtain "opposite handedness". Thus, in FIG. 7 assuming shaft 112 rotation as indicated by the arrow, helical surfaces 151-152 coact to drive male cone 121, female cone 120 if engaged by 121, gear 146 in the direction indicated by the arrows thereon and hence gear 150 is driven in a first direction. Again, assuming rotation of shaft 112 in the direction indicated, helical surfaces 153-154 coact to drive male cone 123, female cone 122 if engaged by 123, and gear 148 in the direction indicated by the arrows thereon and hence gear 150 is driven in an opposite direction. On the other hand, due to the symmetrical arrangement of the surfaces, flipping cone 121 180° will allow it to be used and to function as male cone 123 with female cone 122 and vice versa with respect to male cone portion 123.

Since each set of helical surfaces are constantly overlapping over the entire extent of the axial travel of male 121 and 123, relative to fixed annulus 155, constant driving engagement between male cones 121 and 123 and shaft 112 is readily provided when a male cone engages a female cone and is then brought into contact with helical surfaces on the annulus as shaft 112 rotates against the lagging movement of a male cone. Interaction of the helical surfaces upon rotation of shaft 112 also provides a positive force which urges the male cone against the corresponding female cone to improve the coupling action therebetween.

Gear 146 rests against a thrust washer 156, on shaft 112. The thrust washer in turn may rest against a suitable means such as a set of bearings and races 160 or the like. The thrust washer may be fixed to shaft 112 and rotate with it. Various satisfactory bearing arrangements will be apparent to those familiar with this art.

Gear 148 and assembly 117 also may be supported within a set of bearings and races 162. Again, various satisfactory bearing arrangements will be apparent to those familiar with this art. The clutch members, as mentioned for other embodiments herein, may be especially adapted to cause circulation of the lubricating oil throughout the members. Various clutch members may also be provided with oil passages for oil distribution if desired.

The clutch embodiment described above operates as follows. As is common, the rotary output of an engine is normally in one givent direction. Thus, rotation of shaft 112 will be unidirectional, for example in the direction indicated by the arrow on shaft 112 in FIG. 6. It follows that annulus 155 will be unidirectional in rotation also and will rotate with input shaft 112 in the same direction, again as is indicated by the arrow thereon in FIG. 6. Axial movement of male cone 121 into contact with female cone 120 as shown in FIG. 6 causes rotation of gear 146 through the engaged overlapping helical surfaces 151-152 and rotation of meshing gear 150 and output flange 116 in a first rotary direction as is indicated by the various arrows in FIG. 6. During this action, gear 150 causes gear 148 and female cone 122 to idle on shaft 112.

If male cone 121 is moved away from female cone 120 and male cone 123 placed in contact with female cone 122, rotation of gear 148 occurs in the same direction as that of the previous rotation but since gear 150 remains in mesh with gear 146, gear 146 and cone 120 rotate in the opposite direction.

Engagement and disengagement between the conical surfaces of the female cones and the male cones may be facilitated by making the conical angles thereof slightly different to obtain a slight mismatch therebetween.

The embodiment shown in FIG. 10 demonstrates that the functions of the male and female cone members may be interchanged. In such an embodiment, the helical surfaces of annulus 155 engage helical surfaces on two female cone portions 120' and 122'. The female cone portions are axially movable to engage one or the other of two male cones 121 and 123, respectively.

In its most preferred construction, the arrangement of FIG. 6 will take the form of the most preferred embodiment shown in FIGS. 15 and 16. In this embodiment, the male cones 121 and 123 are connected together, as by several screws 170. As shown in FIG. 16, the head portions of the screws are positioned in arcuate slots 159 alternately carried by each of the male cones which allow some slight rotational movement between the two male cones.

The advantages of this embodiment lies in the fact that shifting may be accomplished with a single shift ring 132 and single shift fork (not shown). Otherwise, the operation is the same as in the arrangement shown in FIG. 6. One other structural variation lies in the use and arrangement of the thrust bearings 156, thrust washers 157 and pins 158.

What is claimed is:

1. In combination
   a rotatable shaft 12;
   a pair of spaced relatively rotatable gears 46, 48 substantially axially fixed on the shaft 12 for rotation thereon;
   means 50 for transferring rotation from one gear to the other;
   a first pair of rotary clutch element means 20, 22 positioned for rotation on the shaft 12 between the pair of spaced gears 46, 48, one of each of the clutch element means being connected to one of each of the spaced gears for rotation therewith;
   a second pair of rotary clutch element means 18a, 18b positioned on the shaft 12 between the first pair of clutch element means 20, 22 whereby one of each of the second pair of clutch element means is adjacent one of the corresponding element means of the first pair and adapted for clutching engagement therewith;
   driving means 18 between the clutch elements of the second pair and secured to the shaft 12 for rotation therewith, said clutch element means 18a, 18b being located at opposite end portions of driving means 18;
   means including two paired sets of complementary helical camming surfaces 52, 54, one paired set each being carried between each of the spaced gears 46, 48 and each of the first rotary clutch element means 20, 22 adjacent thereto;
   each set of helical camming surfaces of each pair being radially distributed about the shaft 12 and movable with the member carrying it, each set of each pair extending toward and overlapping in complement with the other set of the pair whereby reciprocation of one of the clutch element means carrying a set of helical surfaces causes engagement between the sets of the pair during rotation and the rotational movement is transferred between the clutch members; and
   shift control means 30 interconnecting the clutch elements of the pair carrying the helical surface sets for coordinating and controlling their reciprocating movement and axial position on the shaft 12 whereby one or the other of the clutch elements of the pair may be moved along the shaft into engagement with its correspondingly adjacent clutch element of the other pair and both of the clutch elements of the pair may be simultaneously moved on the shaft 12 to a position which is spaced from the clutch element of the other pair.

2. The combination according to claim 1 including rotational output means 16 connected to one of the gears 48 on the shaft.

3. The combination according to claim 1 wherein means 50 comprises a single gear 50 intermeshing constantly with the two spaced gears 46, 48.

4. The combination according to claim 1 wherein the means for transferring rotation comprises a lay shaft arrangement 80.

5. The combination according to claim 1 wherein the first pair of rotary clutch element means and the second pair of rotary clutch element means include adjacent faces 18a, 18b, 20a, 20b.

6. The combination according to claim 5 wherein one of the faces includes an arrangement of grooves 24 thereon for improved contact therebetween.

7. The combination according to claim 1 as a cone clutch wherein the rotary clutch element means comprise oppositely coned male and female mating cone members.

8. The combination according to claim 7 wherein the cone faces of the male and female cone clutch elements are slightly mismatched angularly to facilitate disengagement thereof.

9. The combination according to claim 7 wherein the first pair of rotary clutch element means 20, 22 comprises the female cones.

10. The combination according to claim 7 wherein the first pair of rotary clutch element means comprise the male cones.

11. The combination according to claim 1 wherein the shift control means 30 includes fork means 32, 34 connected to the clutch elements for selectively axially positioning them.

12. The combination according to claim 1 wherein each helical surface set has at least two helical surfaces.

13. In combination:
   a first rotatable shaft 12;
   a pair of spaced relatively rotatable gears 46, 48 substantially axially fixed on the shaft 12 for rotation thereon;
   means 50 for transferring rotation from one gear to the other;
   a first pair of rotary clutch elements 20, 22 positioned on the shaft 12 between the pair of spaced gears 46, 48, each of the clutch elements of the first pair being rotatable and axially reciprocable on the shaft 12;
   a second pair of rotary clutch elements 18a, 18b positioned on the shaft 12 between the first pair of clutch elements 20, 22 whereby each of the second pair of elements is adjacent one of the corresponding elements of the first pair 20, 22 and adapted for clutching engagement therewith, each of the clutch elements of the second pair being rotatable with and axially fixed on the shaft;
   shift control means 30 interconnecting the clutch elements of the first pair 20, 22 for coordinating and controlling their reciprocating movement and axial position on the shaft 12 whereby one or the other of the clutch elements of the first pair may be moved along the shaft into engagement with its correspondingly adjacent clutch element of the second pair 18a, 18b and both of the clutch elements of the first pair may be simultaneously moved on the shaft to a position which is spaced from the clutch elements of the second pair;
   first means comprising two sets of helical camming surfaces 52a, 54a, each set being radially distributed about the shaft 12 and rotatable and reciprocable with one of the clutch elements of the first pair 20, 22 and extending therefrom toward the respectively adjacent gear; and
   second means comprising another two sets of helical camming surfaces 52a, 54a, each set being radially distributed about the shaft and rotatable with one of the gears 46, 48 and extending toward the respectively adjacent clutch element of the first pair and overlapping with one of the sets of the other helical surfaces and in complement therewith, whereby reciprocation of one of the clutch elements of the first pair 20, 22 to cause engagement with the adjacent clutch element of the second pair 18a, 18b during rotation of the clutch element of the second pair, causes engagement between the corresponding helical surfaces 52, 54 thereof and rotational movement is transferred between the clutch members.

14. The combination of claim 13 as a cone clutch wherein the rotary clutch elements comprise two pairs of oppositely coned male 18a, 18b and female cone elements 20, 22.

15. The combination of claim 14 wherein the first pair of clutch elements comprise the female cones 20, 22.

16. The combination according to claim 15 wherein the second pair of rotary clutch elements are carried on a single member 18 attached to the shaft 12.

17. The combination according to claim 14 wherein the second pair 120', 122' of rotary clutch elements comprise the female cones.

18. The combination according to claim 13 including rotational output means 16 connected to one of the gears 48 on the shaft 12.

19. The combination according to claim 13 wherein the means 50 comprises a single gear 50 intermeshing constantly with the two spaced gears 46, 48.

* * * * *